United States Patent [19]

Kamenster

[11] Patent Number: 4,833,923
[45] Date of Patent: May 30, 1989

[54] VORTEX METER PLUG

[75] Inventor: Boris A. Kamenster, Fountain Valley, Calif.

[73] Assignee: ITT Corporation, New York, N.Y.

[21] Appl. No.: 123,501

[22] Filed: Nov. 20, 1987

[51] Int. Cl.[4] ............................................. G01F 1/32
[52] U.S. Cl. ................................................. 73/861.24
[58] Field of Search ........... 73/861.24, 861.22, 272 R; 138/92, 89; 307/118; 361/178; 200/81.9 RM

[56] References Cited

U.S. PATENT DOCUMENTS 4,735,094  4/1988  Marsh ............................... 73/861.24

Primary Examiner—Herbert Goldstein
Attorney, Agent, or Firm—Menotti J. Lombardi

[57] ABSTRACT

A vortex meter plug for retaining an electronic support tube on a sensor and meter body. The plug secures the sensor in place by means of a plug thread. A dowel pin on the meter body prevents rotation of the sensor from the working position, and one or more set screws are directed downward to bite into the body of the sensor to prevent mutual rotation of the plug and the sensor in order to prevent accidental release of the sensor when the pipe is under pressure.

3 Claims, 2 Drawing Sheets

VORTEX METER PLUG

CROSS-REFERENCE TO RELATED APPLICATION

This invention is related to the subject matter of U.S. patent application Ser. No. 008,977 by the inventor hereof entitled "Vortex Meter Sensor" filed on Jan. 30, 1987, which application is assigned to the assignee of the instant invention, and which application is incorporated herein by reference. Application issued as U.S. Pat. No. 4,706,503, on Nov. 17, 1987.

BACKGROUND OF THE INVENTION

1. Field of the Invention

This invention relates to vortex flow meters, and more particularly to an improved vortex meter plug for retaining an electronic support tube on a sensor and meter body.

2. Description of the Prior Art

Prior art vortex meter plugs have either applied a set screw through the meter body into the thread of the vortex plug, wherein the thread is damaged, or no retaining means to prevent relative rotation of the plug and sensor. Such a design damages the threads such that the meter assembly no longer meets applicable specifications.

In accordance with an aspect of the present invention, it is an object to provide a new and improved vortex meter plug.

Another object is to provide such a plug wherein the threads are not damaged by set screws.

SUMMARY OF THE INVENTION

The foregoing and other objects are accomplished by providing a vortex meter plug for retaining an electronic support tube on a sensor and meter body, wherein the plug secures the sensor in place by means of the plug thread and a dowel pin is used on the meter body for preventing rotation of the sensor from the working position. One or more set screws are incorporated substantially parallel axially to the plug and bite into the body of the sensor itself to prevent mutual rotation of the plug and the sensor, in order to prevent accidental release of the sensor when the pipe is under pressure.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
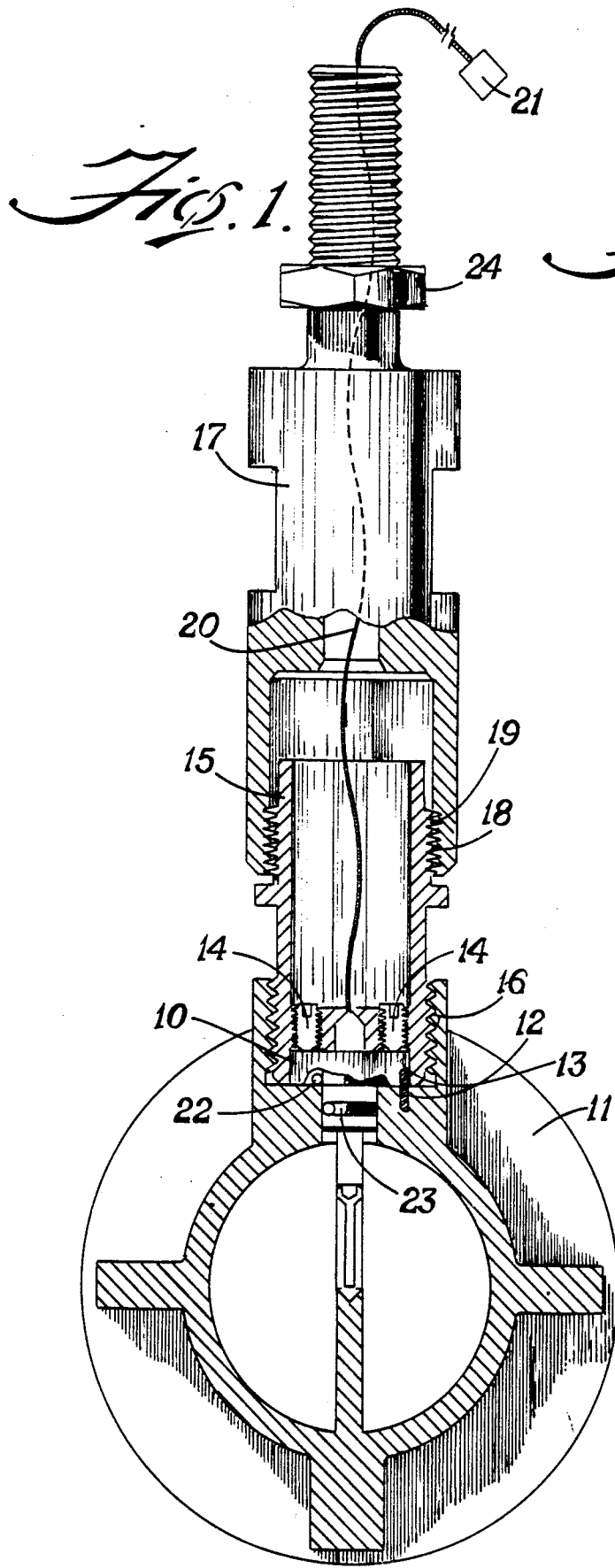
FIG. 1 is a partially cutaway view of an electronic support tube, plug, sensor and meter body taken in the direction of flow.
Figure 2:
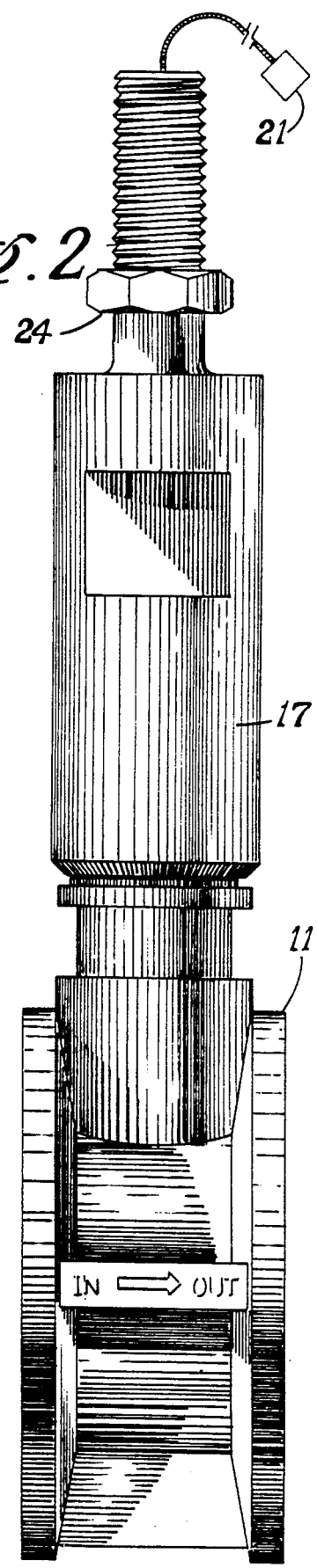
FIG. 2 is a side view of the assembly of FIG. 1.

In the above-referenced application there is disclosed a vortex meter sensor assembly incorporating two parts which are electron beam welded to provide a unitary sensor assembly. Referring now to the drawings and particularly to FIG. 1, the sensor assembly 10 is similar to that of the referenced application. It is secured in the meter body 11 shown in FIGS. 1 and 2, and prevented from rotating by a dowel 12 extending upward from the meter body 11 and into a cutout portion of the flange 13 of the sensor. Two set screws 14 are shown extending downwardly through holes in the plug 15 and parallel to the axis thereof, designed to bite into the flange 13 of the sensor and together with the dowel 12, to prevent rotation of the sensor and the meter body with regard to the plug 15. Threads 16 are employed to screw the plug 15 into the meter body 11. With the set screws 14 being substantially parallel to the axis of the plug 15 and biting into the flange 13 of the sensor 10, they do not interfere or damage the threads 16. An adaptor 17 is employed to connect the electronics 21 to the sensor, plug and meter assembly. By means of threads 18 on the outside of the upper portion of the plug 15 and 19 on the inside of the adaptor 17, an electrical connection 20 extends upwardly from the sensor 10 through the plug 15 and adaptor 17 to the electronics 21. O-rings 22 and 23 are used for fluid tight seals. A hex-nut head 24 is employed for screwing the adaptor 17 onto the plug 15.

Figure 3:
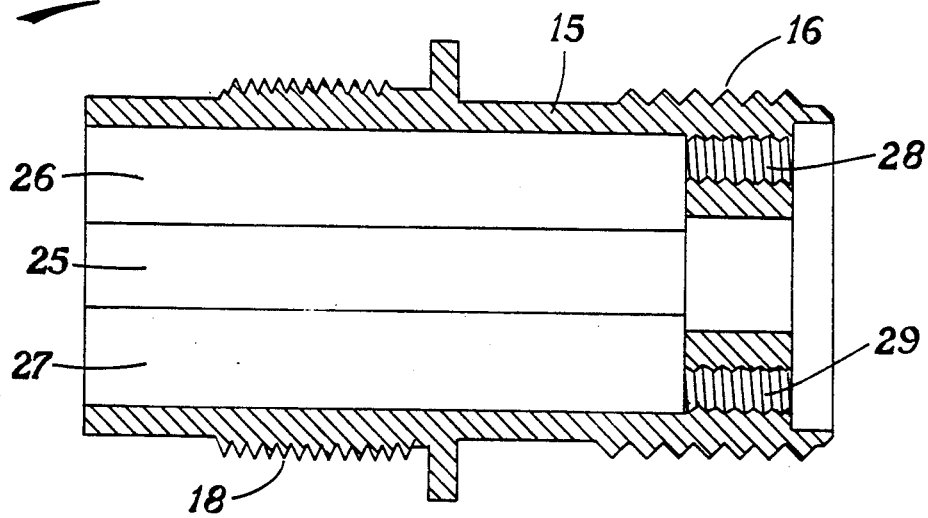
FIG. 3 is a cutaway side view of the plug portion of FIG. 1.
Figure 4:
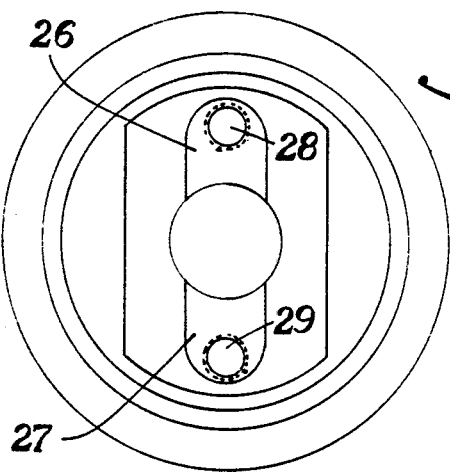
FIG. 4 is an end view looking at the left end of the plug of FIG. 3.
Figure 5:
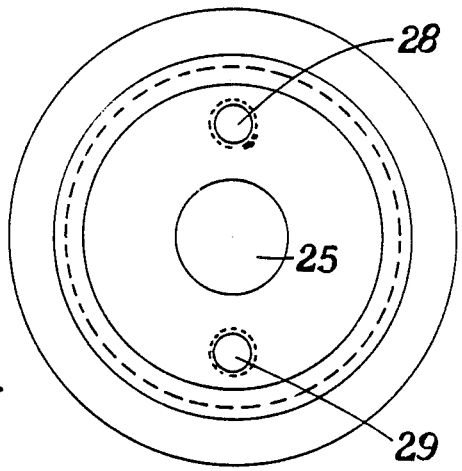
FIG. 5 is an end view looking at the right end of the plug of FIG. 3.

A side view cutaway of the plug 15 is shown in FIG. 3, incorporating a central space 25 through which connection 20 extends. Two sections 26 and 27, parallel to the axis of the plug 15, are used to insert the set screws 14 into the holes 28 and 29, respectively. An end view of this shown in FIG. 4 is taken from the left of FIG. 3. An Allen wrench may be extended down through 26 and 27 to tighten the set screws 14 and cause them to bite into the flange 13 of the sensor 10, preventing rotation of the plug 15 with respect to the sensor 10. FIG. 5 is a view taken from the right of FIG. 3 showing the holes 28 and 29 for the set screws 14, as well as the central hole 25 for the connection 20 to the electronics 21. Set screws 14, as stated previously, prevent relative rotation of the plug 15 and the sensor 10 which in turn prevents accidental release of the sensor 10 when the pipe is under pressure, and when the adaptor 17 and electronics 21 are removed therefrom. When the pipe is under pressure, the sensor 10 can effectively become a bullet and seriously injure a person removing the electronics. With the set screws 14 biting into the flange 13 of the sensor 10, no damage is done to the threads 16 as would be caused by a set screw coming in from the side of the meter body 11 into the threads. This allows meeting of the specifications requiring the threads to be of a certain number and undamaged.

While a particular embodiment of the invention has been described, it will be understood of course that it is not intended to limit the invention thereto, since many modifications may be made. It is therefore contemplated by the appended claims to cover any such modifications as fall within the true spirit and scope of the invention.

What is claimed is new and desired to be secured by Letters Patent of the United States is:

1. Apparatus for a vortex fluid flow meter having a meter body with a conduit through which fluid flows and with an extended cylindrical portion perpendicular to the conduit to mount a sensor having a flange with a cutout portion and said cylindrical portion having an internal thread, the apparatus comprising:

a dowel pin being positioned in the extended portion of the meter body and engaging the cutout portion of said flange to prevent rotation of said sensor;

a cylindrical plug havig first and second ends with threaded outer portions, and said first end having an internal portion with two threaded holes parallel to the axis of said plug, and said first end of said plug being threaded into said cylindrical portion of said meter body to secure said sensor in place;

a pair of set screws, each one of said pair being inserted into one of said two threaded holes to bite into the flange of said sensor to prevent rotation of said plug relative to said sensor and meter body;

an adaptor having an internal thread at one end for screwing the adaptor onto the second end of said plug; and said plug and said adaptor each having a central opening for an electrical connection to extend there through from said sensor.

2. The apparatus of claim 1 wherein said adaptor includes a hex-nut head and an externally thread portion at the end opposite said one end.

3. In Combination:

a vortex meter body with a conduit through which fluid flows, said body having an extended cylindrical portion positioned perpendicular to the conduit and an internal thread;

a sensor having a flange with a cutout portion and being mounted within said extended cylindrical portion;

a dowel pin being positioned in the extended cylindrical portion of said meter body and engaging the cutout portion of said flange to prevent rotation of said sensor;

a cylindrical plug having first and second ends with threaded outer portions, said first end having an internal portion with two thread holes parallel to the axis of said plug, and said first end of said plug being threaded into said cylindrical portion of said meter body to secure said sensor in place;

a pair of set screws, each one of said pair being inserted into one of said two thread holes to bite into the flange of said sensor to prevent rotation of said plug relative to said sensor and meter body;

an adaptor having an internal thread portion at one end of the adaptor for screwing the adaptor onto the second end of said plug; and said plug and said adaptor each having a central opening for an electrical connection to said sensor.

* * * * *